United States Patent [19]
Baermann

[11] 3,837,442
[45] Sept. 24, 1974

[54] BRAKE DEVICE FOR VEHICLES
[76] Inventor: Max Baermann, 506 Bensberg, Cologne/Rhine, Germany
[22] Filed: July 13, 1973
[21] Appl. No.: 378,930

[30] Foreign Application Priority Data
  Feb. 2, 1973  Germany............................ 2305042

[52] U.S. Cl. ............................... 188/159, 188/165
[51] Int. Cl. ............................................ H02k 49/00
[58] Field of Search ........... 188/159, 160, 164, 165; 303/3, 15, 16, 20; 318/87, 88, 204, 209, 211

[56] References Cited
UNITED STATES PATENTS

| | | | |
|---|---|---|---|
| 716,101 | 12/1902 | Potter............................ | 318/211 X |
| 1,161,932 | 11/1915 | Du Bois ........................ | 188/159 UX |
| 2,084,171 | 6/1937 | Volkers............................. | 188/160 |
| 2,257,300 | 9/1941 | Hines............................ | 188/159 UX |
| 2,395,904 | 3/1946 | Oetzel............................ | 188/159 X |

*Primary Examiner*—Duane A. Reger
*Attorney, Agent, or Firm*—Meyer, Tilberry & Body

[57] ABSTRACT

A braking device for vehicles includes a multi-phase generator on the vehicle driven by movement of the vehicle for generating multi-phase electric current. Induction motor means includes a stator and a part which moves relative to the stator during movement of the vehicle. The stator is fixed to the vehicle against movement relative thereto. The generator is connected with the stator of the induction motor for producing a traveling magnetic field in the stator which exerts a force on the moving part in a direction tending to propel the vehicle in a direction opposite to its then direction. This applies a braking force to the vehicle.

12 Claims, 3 Drawing Figures

BRAKE DEVICE FOR VEHICLES

BACKGROUND OF THE INVENTION

This application relates to braking devices for vehicles, and more particularly to electro-magnetic induction braking devices. The invention is particularly applicable for use on vehicles which travel relative to a support defined by a road or rails.

With conventional friction brakes, inertia in a moving vehicle is converted into heat by the brakes. Such friction brakes wear very rapidly. The braking force available with friction brakes is dependent upon the co-efficient of friction between the vehicle wheels and the supporting surface, and on the coefficient of friction between the braking parts.

The high speeds at which modern vehicles travel make it difficult to stop the vehicle in a short distance with non-slip braking when friction brakes are used. Therefore, it is already common practice to provide decelerators in addition to conventional friction brakes. The additional decelerators slow the vehicle down from high speeds, and the friction brakes take over at low speeds. Such decelerators may be of the type using eddy currents.

In known arrangements, a disc or cylinder made of a material having a high electrical conductivity is moved in relation to magnetic poles of alternating polarity. This produces eddy currents in the disc or cylinder conductor. The braking force is produced by the interaction of the exciting field and the magnetic field produced by the eddy currents which acts in opposition to the exciting field. Within the disc or cylinder conductor the eddy currents are short circuited so that braking force can be converted into heat.

In an eddy current brake, the heat produced in the current conductor results in a reduction of available braking force because the electrical resistance of the conductor increases with increasing temperature. A temperature of around 500°–600°C. within the eddy current conductor may reduce the available braking force by up to 50 percent. Therefore, the principal problem with eddy current brakes is the dissipation of heat which is produced in the eddy current conductor.

Arrangements for effectively dissipating heat or cooling the eddy current conductor require a lot of additional assembly and material. In addition, reliability of the brake may be reduced by contamination or failure of the cooling system.

In arrangements where eddy current discs or drums are provided with cooling fins or fan blades, considerable power from the vehicle drive motor is needed for continuously rotating the fan. This reduces the efficiency of the vehicle drive system because the power for driving the fan is used even when the brake is not on. In many cases, the required fan may use more than 5 percent of the total driving energy produced by the vehicle engine.

SUMMARY OF THE INVENTION

In accordance with the present invention, a vehicle braking arrangement is constructed so that all of the parts used for braking are heated to an insignificant degree, while the essential braking energy is converted into electrical energy. The electrical energy is in turn converted into heat in resistances arranged outside of the braking device.

More specifically, the improved braking arrangement of the present invention includes a multi-phase electrical generator driven by the vehicle and induction motors having a stator and a member which moves relative thereto during movement of the vehicle. The stator is fixed to the vehicle against movement relative thereto. The generator stator is connected with the motor stator so as to produce a traveling magnetic field acting on the moving member in a direction tending to propel the vehicle in a direction opposite to its then direction. This provides a braking force for the vehicle.

In one arrangement, the moving member is rotatably driven by movement of the vehicle. The traveling field in the stator travels in a direction opposite to the direction of rotation of the member and thus opposite to the direction of vehicle movement. The member has ferromagnetic and/or electrical conductors which are acted upon by the traveling field in the stator to produce an opposite field. The opposed fields retard rotation of the rotor.

In accordance with another arrangement, where the vehicle travels on electrically conductive rails, the induction motor may comprise a linear induction motor wherein the stator moves with the vehicle and is in spaced but inductive relationship with the rails. The stator has multi-phase windings thereon connected with the generator stator so as to produce a traveling magnetic field which moves in a direction opposite to the direction of vehicle motion and thus produces a force on the rails opposite to the direction of movement. Also, eddy currents are produced in the rails which generate magnetic fields opposed to the fields produced by the winding for braking the vehicle.

One advantage of a braking device constructed in accordance with the present invention is that a separate source of current is not necessary. This is because the multi-phase generator is driven by the vehicle and also acts as a brake itself. The resultant braking force comprises the energy required to drive the multi-phase generator and the motive force generated in the induction motors. The multi-phase generator can be of relatively small dimensions and may be connected with a rotating part on the vehicle. When braking force is desired, the multi-phase generator may be excited either electrically or by means of permanent magnets. Therefore, when braking energy is not desired, the braking system will not take energy from the vehicle drive motor.

Vehicles on which the braking device of the present invention is used normally have a drive-train structure including a drive shaft, wheel structure and wheel shaft or axle structure. Preferably, the multi-phase generator and the rotor of the induction motor are connected to be rotatably driven by one of these defined structures during movement of the vehicle.

It is a principal object of the present invention to provide an improved braking device for vehicles.

It is another object of the present invention to provide an induction-type of vehicle braking device which generates very little heat.

It is a further object of the present invention to provide a vehicle braking system wherein the necessary current is produced by a multi-phase generator driven by movement of the vehicle.

It is also an object of the present invention to provide an improved vehicle braking system which is relatively simple in operation, and relatively inexpensive to manufacture.

Another object is the provision of a railed vehicle braking system where a multiphase linear motor acts on the rail to produce a motive force opposite to the direction of vehicle movement. A large percentage of the braking energy thus is dissipated in the large mass of the rails.

It is still a further object of the present invention to provide an improved braking system which is completely wear free during braking.

A further object of the invention is the provision of an improved vehicle braking system comprised of a multi-phase generator driven by movement of the vehicle and energizing a multiphase motor for movement in a direction to oppose such vehicle movement.

BRIEF DESCRIPTION OF THE DRAWING

The invention may take form in certain parts and arrangements of parts, preferred embodiments of which will be described in detail in this specification and illustrated in the accompanying drawing which forms a part hereof.

Referring now to the drawings, wherein the showings are for purposes of illustrating preferred embodiments of the invention only and not for purposes of limiting same, FIG. 1 shows a vehicle A on which the braking device of the present invention is used. Vehicle A may comprise an automobile, bus or truck movable relative to a road surface on wheels. Vehicle A may also comprise a train or the like movable relative to metal rails on supporting wheels.

Figure 1:
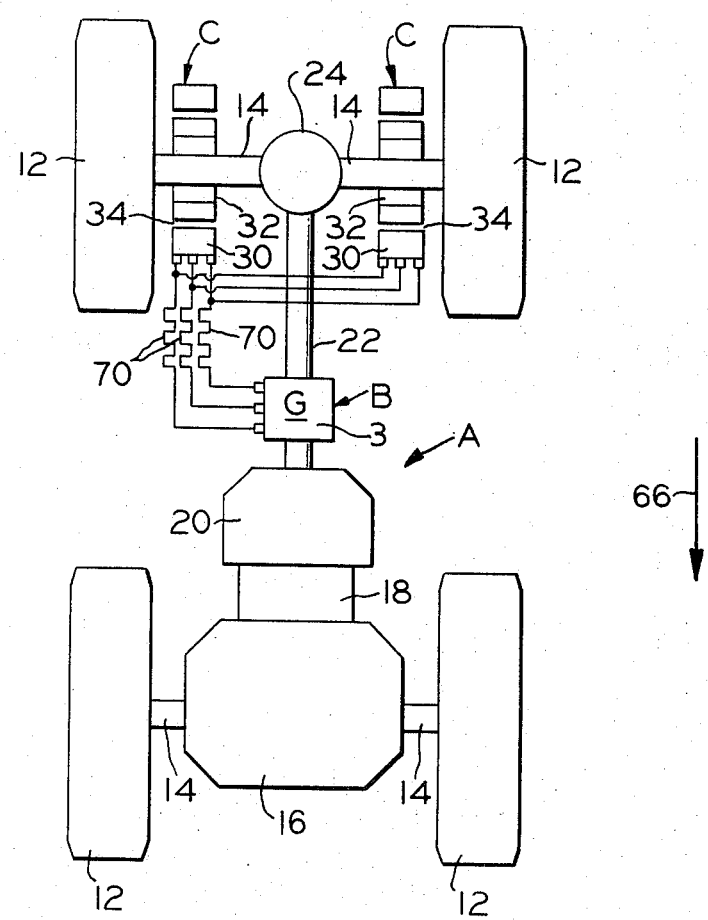
FIG. 1 is a schematic top plan view illustrating the braking device of the present invention mounted on a vehicle.

Vehicle A includes wheels 12 rotatably mounted on wheel axles or shafts 14. Vehicle A includes a drive motor 16, such as an internal combustion engine, connected through clutch means 18 with a gear box 20. Gear box 20 is connected by drive shaft 22 with differential 24 for rotatably driving a pair of wheels 12 to propel vehicle A over the supporting surface.

In accordance with one arrangement, a three-phase electrical generator B is connected with drive shaft 22 between gear box 20 and differential 24. The rotor of generator B is connected with drive shaft 22 for being rotatably driven thereby when drive shaft 22 is rotated.

In one arrangement, three-phase generator B supplies electrical energy to the windings of induction motors C. One or more induction motors C may be provided depending upon the required braking force. In one arrangement, induction motors C may comprise squirrel cage induction motors.

In one arrangement, stators 30 of induction motors C are fixedly mounted to stationary parts on vehicle A so that stators 30 do not move relative to vehicle A. Rotors 32 of induction motors C are rotatably mounted within stators 30 and are connected with rotating portions of axle 14 for being rotatably driven thereby. Naturally, an air gap as at 34 is provided between each stator 30 and each rotor 32.

Figure 2:
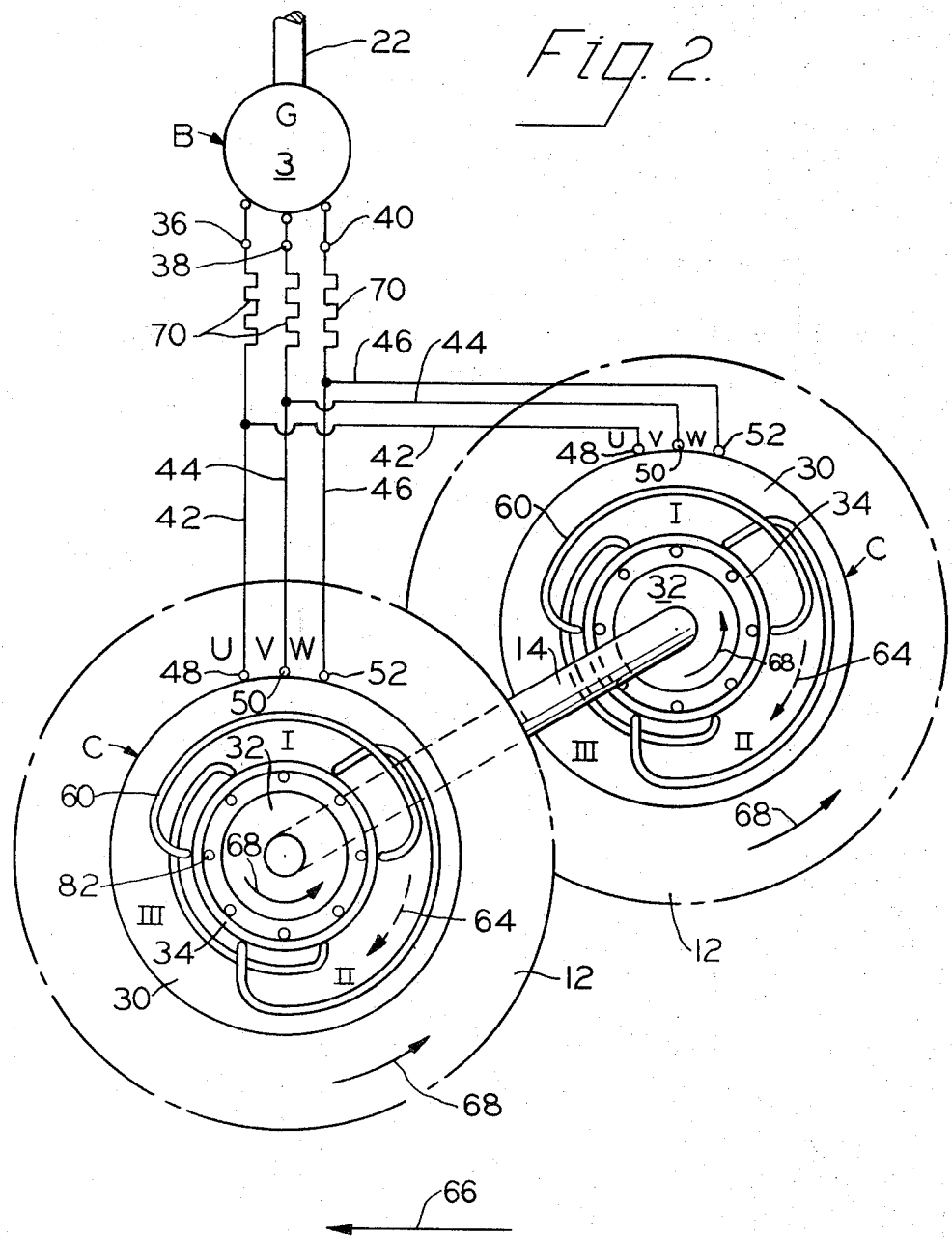
FIG. 2 is a perspective illustration of the braking device of the present invention; and, FIG. 3 is an elevational view showing another type of braking device constructed in accordance with the present invention.

Three-phase generator B generates three-phase electrical current at terminals 36, 38 and 40. Terminals 36, 38 and 40 are connected by wires 42, 44 and 46 with terminals 48, 50 and 52 on coil windings 60 of stators 30. In the arrangement shown, both stators 30 are connected in parallel. Each stator 30 is provided with winding for three-phase current. The individual coils these windings are identified by Roman Numerals I, II and III in FIG. 2. These windings are arranged and connected in a known manner to produce a rotating field moving in the direction of dotted line arrows 64. With vehicle A moving in the direction of arrow 66 in FIG. 2, wheels 12 and rotors 32 are rotating in the direction shown by solid line arrows 68. Thus, the traveling field represented by arrow 64 is traveling in a direction opposite to the direction of rotation of rotors 32, and also opposite to the direction of motion 66 in which vehicle A is moving. The fields traveling in the direction of arrows 64 in stators 30 generate an opposite field in the short-circuit 82 windings or the ferromagnetic members on rotors 32. The fields oppose one another so that rotation of rotors 32 in the direction of arrows 68 is retarded. This applies a braking force to wheels 12 for braking vehicle A.

In accordance with one arrangement, a plurality of resistances 70 may be connected in series in each line 40, 42, and 46 in order to limit the current within windings 60 of stators 30. Resistances 70 also dissipate considerable heat outside of generator B and induction motors C so that generator B provides considerable braking effect.

Figure 3:
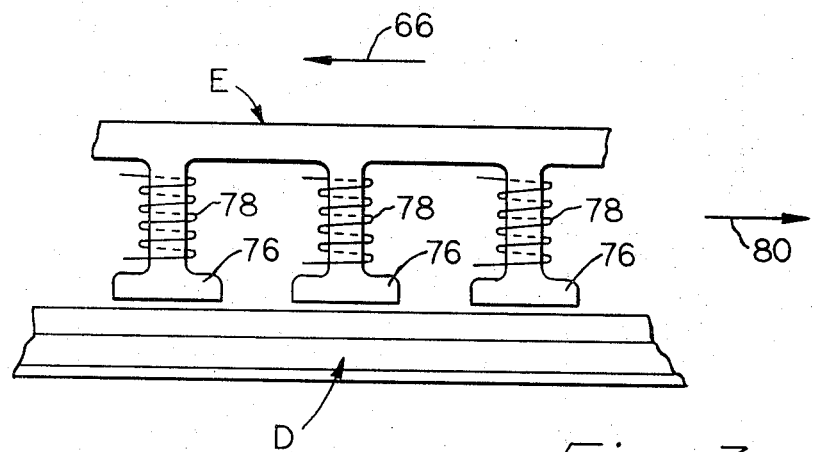

FIG. 3 shows an arrangement wherein the vehicle is adapted to travel on wheels supported by electrically conductive rails as at D. A magnetic system E is mounted in a fixed position on the underside of the vehicle. Magnet system E has a plurality of poles 76 spaced-apart in a direction parallel to rail D. The outer surfaces of poles 76 face rail D across a small air gap. Poles 76 are provided with coil windings 78. Three-phase generator B is connected with windings 78 on poles 76 for producing a traveling field at the pole surface which travels in a direction opposite to the direction of vehicle motion represented by arrow 66. The direction in which the traveling field moves is generally indicated by arrow 80. This traveling field produces a propelling force to the vehicle in the direction of arrow 80 opposite to its then direction of motion so that the vehicle is braked. The arrangement of FIG. 3 can be compared to a linear motor.

The braking force produced in accordance with the arrangement of the present invention is from a combination of the energy to drive generator B and the opposite propelling force of induction motors C. Therefore, both generator B and induction motors C can be constructed very compactly with considerable savings in space.

The braking arrangement of the present invention is completely independent of outside electrical energy sources because the necessary electrical energy is produced by a generator driven by the vehicle. The braking device of the present invention is also wear free and relatively maintenance free because it can be completely mounted within a closed housing.

It will be recognized that the braking system of the present invention is still effective at relatively low vehicle speeds. This is due to having the rotary field in the induction motor stator traveling in a direction opposite to the direction in which the squirrel cage rotor rotates. The relative speed at which the stator field cuts the electrical conductors in the rotor is increased to a considerable extent due to the opposite directions of movement between the traveling stator field and the rotor rotation. The relative speed at which the traveling stator field cuts the electrical conductors or ferromagnetic members in the squirrel cage rotor is decisive of the amount of braking effect.

For the purpose of adjusting the induced voltage or current in generator B, the rotor or the stator can be formed from a plurality of axially-separated pole rings each having a plurality of spaced-apart permanent magnets or a plurality of windings thereon. At least one pole ring is angularly adjustable relative to the other pole rings by an amount up to one pole pitch of the rotor or stator for varying the induced voltage. Such an arrangement is shown and described in more detail in U.S. Pat. application Ser. No. 153,785 filed June 16, 1971, the disclosure of which is hereby incorporated by the reference herein.

In order to avoid excessive current values within induction motor rotors 30, current limiters, such as resistances, thyristors or the like may be disposed between generator B and motors C. In addition, it is possible to provide resistances within the rotor of the induction motors which are exposed to a stream of cooling air. The amount of resistance required is dependent upon the number of induction motors provided for braking, along with the type of connection relative to the multi-phase current, and the electrical power of the motors.

Induction motors C are preferably of the asynchronous type. In addition, induction motors C are preferably formed as disc-type induction motors, that is, rotors 32 are generally disc-shaped. Disc-type induction motors are well known in the art.

Load resistances may also be connected with the output of generator B in order to convert some of the energy generated to heat. The excess electrical current not required for exciting windings 60 of stators 30 may be dissipated by such load resistances. The resistances can be arranged on any part of the vehicle where the heat will be effectively dissipated by a cooling air stream caused by motion of the vehicle. The load resistances can be located so that the heat will have no harmful effect on any part of the vehicle or on parts of the braking system.

The braking system of the present invention provides easy operation and adjustment. Operation by the operator of vehicle A can be effected electrically, pneumatically, hydraulically or mechanically. For example, a Bowden cable or rod may be provided for adjusting the output of generator B to control the energization of motors C.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the claims.

The invention is particularly advantageous when the motor is a linear induction motor acting on the rails supporting the vehicle. Here the braking force is independent of the coefficient of friction developed between the vehicle wheels and the rails, which as known, can vary widely due to changing conditions such as water or lubricants on the rail surfaces. Also, the braking force is larger than that obtained by an eddy current type rail brake. Also the energy of the moving vehicle mass will be dissipated as heat in the large mass of the rails rather than in heat dissipating members mounted on the vehicle.

Having thus described my invention, I claim:

1. A braking device for a vehicle movable relative to a support in a predetermined direction, comprising; multi-phase generator means driven by movement of said vehicle for generating multi-phase electric current, multi-phase induction motor means having a first part stationary with respect to said vehicle and a second part movable relative to said vehicle and said first part, said generator means being connected to said first part for producing a traveling field in said second part traveling in a direction opposite to the direction in which relative movement takes place between said first and second parts.

2. The device of claim 1 wherein said first part comprises an induction motor stator mounted on said vehicle and said second part comprises an induction motor rotor rotatably mounted on said vehicle, said rotor being connected with a rotating part of said vehicle for being rotated during movement of said vehicle, said traveling field traveling in a direction opposite to the direction in which said rotor rotates.

3. The device of claim 2 wherein said induction motor means comprises asynchronous induction motor means.

4. The device of claim 2 wherein said induction motor means comprises disc-type induction motor means.

5. The device of claim 2 and including load resistances connected with the current output of said generator means for converting electrical energy to heat.

6. The device of claim 1 and including load resistances connected with the current output of said generator means for converting electrical energy to heat.

7. The device of claim 1 wherein said support on which said vehicle moves comprises electrically conductive rail means and said induction motor means comprises linear induction motor means, said second part of said induction motor means being defined by said rail means and said traveling field traveling in a direction opposite to said predetermined direction in which said vehicle moves.

8. The device of claim 7 and including load resistances connected with the current output of said generator means for converting electrical energy to heat.

9. A braking device for a vehicle movable relative to a support in a predetermined direction, comprising; multi-phase generation means on said vehicle and driven by movement of said vehicle for generating multi-phase electric current, induction motor means having first and second cooperating relatively movable parts between which relative movement occurs during movement of said vehicle, said first part being fixed to said vehicle against movement relative thereto, said generator means being connected with said first part for producing a traveling field in said first part which cooperates with said second part and travels in a direction tending to propel said vehicle in a direction opposite to said predetermined direction whereby braking force is applied to said vehicle.

10. The device of claim 9 wherein said vehicle includes drive train structure, wheel structure and wheel axle structure, said generator means being connected to be driven by one of said structures during movement of said vehicle.

11. The device of claim 10 wherein said first part of said induction motor means comprises a stator and said second part comprises a rotatable rotor connected to be rotatably driven by one of said structures during movement of said vehicle, said traveling field traveling in said stator in a direction opposite to the direction in which said rotor rotates and opposite to said predetermined direction of vehicle movement.

12. The device of claim 9 wherein said support on which said vehicle moves comprises electrically conductive rail means and said induction motor means comprises linear induction motor means, said second part of said induction motor means being defined by said rail means and said traveling field traveling in a direction opposite to said predetermined direction in which said vehicle moves.

* * * * *